United States Patent [19]

Mathieu

[11] 4,434,498

[45] Feb. 28, 1984

[54] PROCESS AND APPARATUS FOR SYNCHRONIZATION OF DIGITAL SIGNALS

[75] Inventor: Michel Mathieu, Betton, France

[73] Assignee: Telediffusion de France, Issy les Moulineaux, France

[21] Appl. No.: 264,842

[22] Filed: May 18, 1981

[30] Foreign Application Priority Data

May 19, 1980 [FR] France ................................ 80 11139

[51] Int. Cl.³ ............................................... H04L 7/02
[52] U.S. Cl. .................................... 375/114; 375/118; 370/101
[58] Field of Search ............... 375/106, 113, 114, 116, 375/112, 118; 371/42, 47; 370/100, 101, 105, 106; 328/63, 72; 364/200 MS File

[56] References Cited

U.S. PATENT DOCUMENTS

| | | | |
|---|---|---|---|
| 3,420,956 | 1/1969 | Heightley et al. | 375/112 |
| 3,777,066 | 12/1973 | Nicholas | 375/114 |
| 3,873,773 | 3/1975 | Guy, Jr. | 375/112 |
| 4,045,613 | 8/1977 | Walker | 375/112 |
| 4,054,747 | 10/1977 | Pachynski, Jr. | 375/118 |
| 4,175,287 | 11/1979 | Fuhrman | 375/118 |
| 4,181,975 | 1/1980 | Jenkins | 375/118 |
| 4,187,394 | 2/1980 | Sievers | 375/118 |
| 4,214,124 | 7/1980 | Jarus | 375/114 |
| 4,270,183 | 5/1981 | Robinson et al. | 375/118 |
| 4,301,534 | 11/1981 | Genter | 370/105 |

FOREIGN PATENT DOCUMENTS 2178418 9/1973 France .
203944B 6/1980 United Kingdom .

OTHER PUBLICATIONS

Dhadesugdor et al., "Delta Modulation Packet Voice Network with a Variable Packet Size Algorithm", Nov. 1979, National Telecommunications Conference, pp. 13.2.1–13.2.5.

Kundig, "A Switching Unit for Integrated PCM Communication", Apr. 21–25, 1969, Conference on Switching Techniques for Telecommunications Networks.

Jankowski, Jr. "A New Digital Voice-Activated Switch" Spring 1976, Comsat Technical Review, pp. 159–178, vol. 6, No. 1.

*Primary Examiner*—Robert L. Griffin
*Assistant Examiner*—Stephen Chin
*Attorney, Agent, or Firm*—Larson and Taylor

[57] ABSTRACT

A digital signal formed from successive words representing quantized samples of sound information and comprising silent periods is synchronized with a local reading clock. For that, the words are stored in a random access memory as they arrive, they are read at the frequency of the local clock and the filling rate of the store is permanently determined. A comparator compares this rate with a given range. If the filling rate is greater than a maximum threshold or less than a minimum threshold, the contents of the memory are modified at the first silent interval which appears.

9 Claims, 2 Drawing Figures

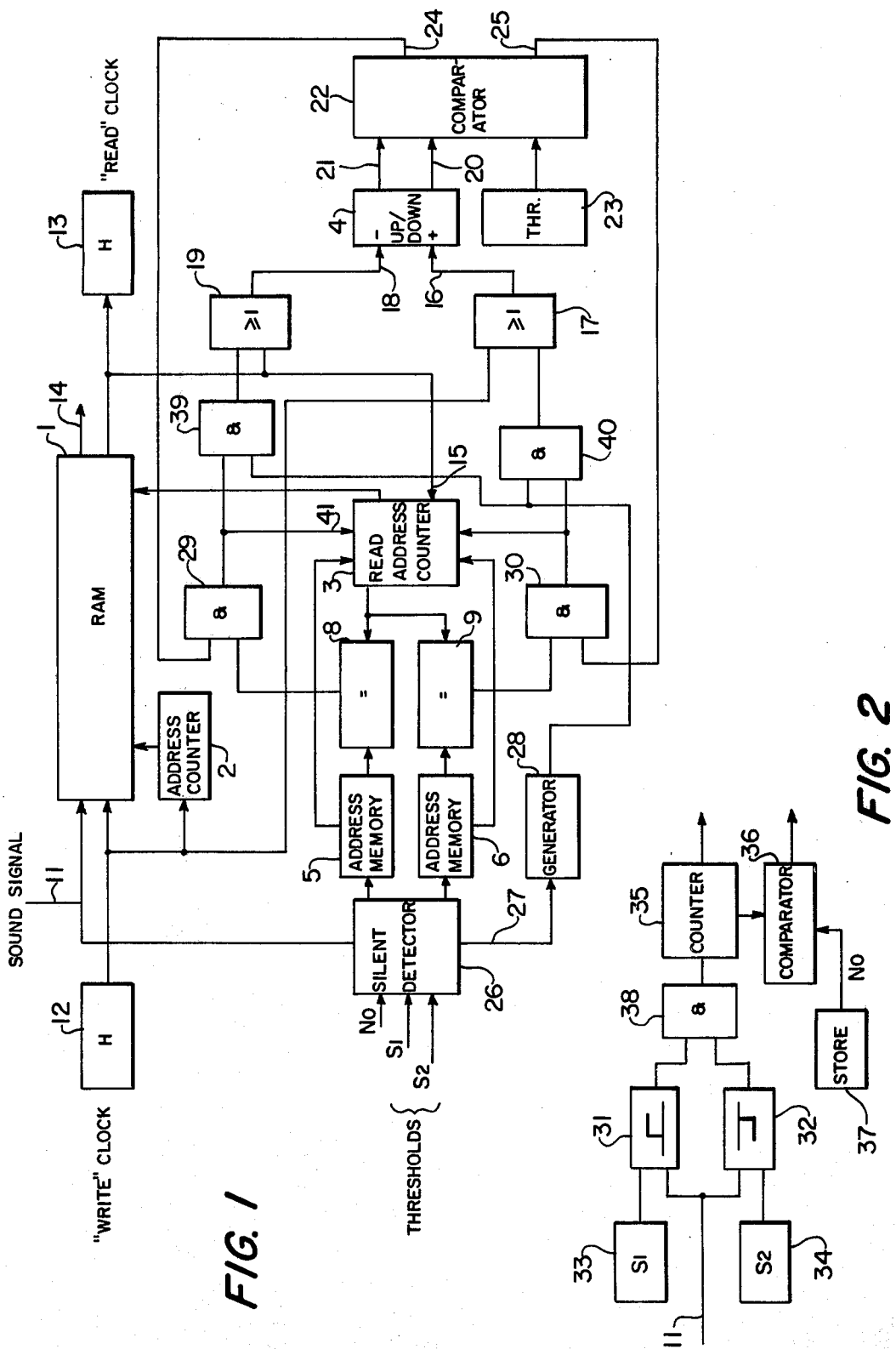

PROCESS AND APPARATUS FOR SYNCHRONIZATION OF DIGITAL SIGNALS

BACKGROUND AND SUMMARY OF THE INVENTION

This invention relates to the synchronization of digital signals, formed from successive words representing quantized samples of sound information and received from an asynchronous source, with a local reference clock; it is particularly—though not exclusively—suitable for use in the field of digital sound broadcasting.

The present techniques for transmitting, broadcasting and recording sound sources frequently involve coding the signals from such sources in digital form. The analog sound signal, supplied by the source, having a predetermined passband, is transformed into a succession of words of each x bits, called samples, representative of quantized values of the analog signal at specific regularly spaced times, called sampling times. The values of the sampling period and of the number x of bits per sample characterize the quality of the coding and depend on the nature of the signals to be processed. After transmission or recording, the digital data must be reconverted by a D/A converter which requires a local reference timing clock or time base. In order to generate the reference clock, the times of arrival of the successive samples are extracted from the received train of words. Their nominal frequency—i.e. the frequency determined by integration over a long period of time—is equal to the sampling frequency used for A/D conversion of the sound signal.

Unfortunately, the equipment through which the signal passes between the A/D and D/A conversions (line equipment in the case of transmission or broadcasting; and digital equipment in the case of recording) causes disturbances in the spectrum of the reconstituted clock rate. For example, the multiplexing equipment in digital networks is able to accept a limited amount of phase jitter, but it creates jitter which has low frequency spectral components which cannot be easily eliminated. Recorders exhibit similar deficiencies when they are not designed for servo-controlling the time base.

Moreover, it is often difficult or impractical to control a reception station for synchronizing it with an external timing rate, if the station has its own reference clock.

Multiplexing processes are already known for data transmission by "frames" in which "blank" words are inserted at a predetermined rate (French Patent No. 2,178,418). The result to be achieved is mixing of several incoming frames so as to form a single output signal. There is no processing of the signal. The article "A switching unit for integrated PCM communication", Conference on Switching Techniques for Telecommunication Networks, Apr. 21-25, 1969, pp. 157-160, describes a technique which involves prestuffing null words beforehand into the message. Again, the process does not use the particular features of the digital sound signals and is not applied to synchronization of a receiver which processes the signal.

In "A new digital voice actuated switch", Comsat Technical Review, Vol. 6, No. 1, pp. 159-178, there is described a procedure for detecting time intervals in a signal representing the voice when silence occurs. Such a procedure is specific to that type of signal and is used for time multiplexing only. British patent application No. 2,039,448 describes a method and apparatus for altering the timing of digital sound signal samples during substantially silent intervals which are detected by measuring the differences between successive adjacent samples or the absolute values of successive samples.

It is an object of the invention to synchronize received digital sound information signals with a local clock asynchronous with said signals, i.e. to match the timing of the digital signal to that of the clock, in a simple way; it is a more specific object to provide for efficient detection of "silent" intervals during which synchronization may be achieved by omitting or repeating samples representative of silences.

In this respect, it should be remembered that digital signals obtained from a sound source include silent periods, which may be lengthened or shortened without substantial drawback.

According to an aspect of the invention, a process for synchronizing digital signals consisting of successive words representing quantized samples of sound information and comprising silent periods with a local reference clock during conversion or restitution, comprises the steps of storing the words in a local buffer store as they are received and reading them at the frequency of a local clock. The degree of filling or occupancy of the store is continuously monitored and compared with a range between predetermined maximum and minimum filling thresholds. The contents of the store are modified upon detection of the first silent interval after it has been determined that the degree of occupancy is outside said range. For that purpose, the store is emptied by discarding a number of samples if the degree of occupancy is higher than the maximum threshold, filled by repeating samples in the opposite case.

In other words, the degree of occupancy of the store is monitored continuously, after it has been filled up to a predetermined level (typically half its capacity) before the beginning of reading out. Depending on the difference between the writing (or input) rate and reading out (or output) rate, the store will fill up or empty. Above a predetermined upper filling threshold, the output flow will be artificially and temporarily increased during the first silent interval to occur. Under a lower filling threshold, the output flow will be artificially and temporarily reduced during the first silent interval.

The process of the invention involves searching for silent periods in the digital signal and an important aspect of the invention relates to such search. According to the invention, an interval will be considered as silent if corresponding to a continuous sequence of N samples (N being greater than a predetermined number $N_0$) whose values are comprised between two predetermined extreme values S1 and S2. The maximum S1 and minimum S2 values may be implicit or programmable as explained in more detail hereunder. A possible DC offset of the sound signal during the A/D conversion may be corrected by appropriate programming of S1 and S2.

The parameter $N_0$ characterizes the minimum time length during which the samples should be lower than thresholds for detection of a silence: its value may be implicit or programmable as well.

It can be seen that a silent interval is at least partially discarded when an increase of the output flow is desired: the stored contents then decrease by N samples if the silent interval is totally deleted; a silent interval may be repeated—or extended by a predetermined duration—when a reduction of the output flow is required for synchronization.

The value $N_0$ may be selected depending on the relative permissible maximum difference between the writing and reading out frequencies; and on the statistical distribution of the "silent intervals" in the modulation as received.

A device according to the invention suitable for carrying out the above-defined process, comprises a random access memory stored associated with means for writing the words therein at the frequency of their arrival and with means for reading out the store at the frequency of a local clock; means for detecting the degree of filling of the store and for comparing it with range limited by predetermined minimum and maximum filling thresholds; a silent interval detector; and means controlled by the comparison means and the detector for partially filling or emptying the store, as the case may be, during the first silent interval after the degree of filling has passed outside the range.

In the above definitions, the words "sound information" are to be understood as designating any information having a time distribution comparable to that coming from a sound source properly speaking, comprising therefore silent intervals.

The invention will be better understood from the following description of an embodiment, given by way of example only.

SHORT DESCRIPTION OF THE DRAWINGS

FIG. 1 is a simplified diagram of the circuits of the apparatus integrated in a receiver;

FIG. 2 illustrates a possible construction of the silent interval detection means of FIG. 1.

DETAILED DESCRIPTION OF A PREFERRED EMBODIMENT

Referring to FIG. 1, the apparatus comprises a RAM store 1 having an input 11 which receives the digital sound signal from a coder, through a coupler (not shown). A "writing" or input clock 12 associated with the store 1 extracts, from the succession of digital words arriving at input 11, the sampling frequency which forms the writing frequency. A local "read" or output clock 13 is also associated with store 1. Its nominal read or output frequency has a nominal value close to the value of the sampling frequency of the A/D encoder which supplies the signals applied to the input 11 of store 1. The difference between these two frequencies will depend on the accuracy and stability of the clocks used. Present techniques readily provide an accuracy of $10^{-6}$. The low offset between the A/D and D/A conversion frequencies creates no perceptible degradation of the sound signal.

Store 1 is structured in words or bytes of x binary elements, x being the number of bits per sample, and it operates in FIFO mode. The successive digital words appear in sequence at output 14, connected to a D/A converter.

Means are provided for permanently measuring the degree of filling or occupancy of the store. They comprise a writing address counter 2 and a reading address counter 3, which respectively define the addresses which are being written and read out in store 1. A system for initializing the procedure, not shown, causes half filling of the store by writing up to half its capacity, before reading is initiated, and loads counters 2 and 3 so that the absolute value of their difference (modulo the capacity of the store) is equal to half the total capacity of the store. In other words, the writing and reading pointers are then at a maximum distance from each other. Counter 2 is connected to the output of clock 12 so that at each writing in store 1 this writing address counter 2 is incremented by one (modulo the capacity of the store). The reading address counter 3 has its incrementation input connected to the output of clock 13 so that at each read-out from store 1 this counter 3 is incremented by one (modulo the capacity of the store).

The filling may thus be determined by comparing the contents of counters 2 and 3. For that, measuring means further comprise an updown counter 4, which will be called hereafter shift threshold counter, which the initialization system resets at the beginning of the procedure. The incrementation input 16 of threshold counter 4 is connected to the output of write clock 12, through an OR gate 17, the purpose of which will become clear further on, so that counter 4 is incremented by one at each write-in. Its decrementation input 18 is similarly connected to clock 13 through an OR gate 19, so that the counter is decremented at each read-out. Thus, a more rapid read-out rate than write-in rate will lead to a negative value of this counter and conversely.

The absolute value of the contents of the counter appears at a multi-bit output 20 and the sign appears in the form of a binary signal at a second output 21.

Counter 4 which represents the filling of store 1 is associated with a comparator 22 which receives, on the one hand, the outputs of counter 4 and, on the other hand, a special signal from a generator 23 which delivers a multi-bit signal representative of the maximum difference accepted between the contents of store 1 and half capacity. The generator 23 may be a fixed threshold or programmable generator; the choice will depend on the nature of the transmission, broadcasting or recording system used.

Comparator 22 is provided so as to supply no signal when the contents of offset threshold counter 4 is less, in absolute value, than the threshold displayed by generator 23 and to supply a logic signal at one of the outputs 24 and 25, depending on the sign indicated at output 20, when the absolute value of the contents of counter 4 exceeds the displayed threshold.

Outputs 24 and 25 are connected to resynchronization means for activating them when they supply a signal. These means come then into action at the first silent interval, which involves the provision of means for detecting this latter and means for shortening or extending the silent interval.

A silent interval will be characterized by a continuous succession of at least $N_0$ successive samples whose values are between two given extreme values S1 and S2. These values are generally one positive and the other negative, symmetrical or different due to possible offset. The means for detecting a silent interval thus defined may be formed as shown in FIG. 2. These means comprise two comparators 31 and 32 which receive the successive samples and compare their value with the thresholds S1 and S2. The thresholds S1 and S2 may be programmed implicitly, locally or by a special data signal accompanying the digital sound signal.

The simplest solution obviously consists in using values S1, S2 and $N_0$ fixed once and for all: this solution is satisfactory when the sound signal transmitted has a single type of modulation (e.g. speech). It is also possible to provide manual programming which may be limited to a single multi-position switch (e.g. speech, classical music and pop music). The notion of silent interval being related to the type of modulation, such matching allows a satisfactory compromise to be reached in the search for silent intervals between a low frequency of timing operations and the requirement of avoiding filling the store.

An interesting solution when it is desired to automatically match the criteria in the search for silent intervals consists in effecting this latter at the coder and in transmitting $N_0$, S1 and S2 (or the position and the duration of the silent intervals) by means of a separate data channel. Thus the silent intervals may be detected (which is the most delicate operation) at a single point and either the information concerning the presence of a silent interval or the definition criteria may be fed to the multiple timing or synchronization devices placed downstream in the data path.

In this case, adaptation of S1 and S1 may be effected for example by starting from the condition that the range between silent intervals detected must not exceed a given duration: S1 and S2 are first of all fixed so as to define a narrow range, then automatically moved apart if no silent interval has been detected after a given fraction of the duration. The threshold values S1 and S2 are respectively stored in stores 33 and 34. An AND gate 38 connected to the comparators supplies to counter 35 a signal which causes incrementation of the counter by the clock 12 if it indicates a sample value between S1 and S2, the synchronous resetting in the opposite case. A comparator 36 compares the contents of counter 35 with the value $N_0$ stored in a store 37. Like the thresholds, $N_0$ may be programmed implicitly, locally or by a special data signal accompanying the digital sound signal. $N_0$ will be typically less than the threshold signal supplied by the genterator 23.

The presence of a signal at the output 39 of comparator 36 characterizes the presence of a silent interval in the signal received. In this particular case, the means for detecting the silent interval supply information about the appearance of the $N_0$ order sample of a silent interval. The beginning of the silent interval may obviously be deduced therefrom, $N_0$ samples earlier.

This information is sufficient to carry out the procedure of synchronization of reading. The means shown in FIG. 2 may be replaced by any other system for detecting the beginning of the silent interval and either the conventional number $N_0$ (case of FIG. 2), or the total effective duration N. These systems may be placed upstream of the digital sound transmission channel, the silent interval information being then transmitted over a channel parallel to the channel for transmitting the digital sound signals.

In FIG. 1, the silent interval detecting means have been shown generally by a system 26 to which are applied the predetermined values $N_0$, S1 and S2. This system 26 comprises an output 27 for controlling a generator 28 which supplies, whenever it is energized, a sequence of $N_0$ pulses in a period less than a period of clock 13 and the purpose of which will appear further on. System 26 is provided for also supplying signals at outputs connected to buffer stores 5 and 6 as soon as they detect a silent interval. These control signals cause the silent interval beginning address to be stored in store 5, and the silent interval end address ($N_0$ order sample) in store 6. The address signals contained in stores 5 and 6 are respectively applied to two comparators 8 and 9 which also receive the indication of the address contained in write address counter 3. Comparators 8 and 9 are connected to the inputs of respective AND gates 29 and 30 also driven by the outputs 24 and 25, respectively. The AND gates 29 and 30 drive, through an AND gate 39 and an AND gate 40, OR gates 17 and 19 respectively. Such being the case, the operation of the device shown in FIG. 1 is the following.

As soon as the shift threshold fixed by generator 23 has been reached, comparator 22 supplies a signal at output 24 or output 25, depending on whether the contents of counter 4 are positive or negative. This signal enables AND gate 29 or 30, as the case may be, so that the shift will be reduced during the first silent interval which appears.

As soon as a silent interval is detected, the addresses in store 3 for the beginning and the end of the silent interval are respectively transferred or stored in stores 5 and 6.

If the contents of counter 4 are positive, comparator 8 feeds to the input 41 of store 3, through the AND gate 29, an order for loading counter 3 to the value contained in store 6 (end of silent interval) as soon as the read address counter 3 displays the contents of store 5. At the same time, the output of AND gate 29 enables AND gate 39 and causes decrementation of counter 4 by $N_0$ units by means of pulse generator 28.

Similarly, if the contents of counter 4 are negative, comparator 9 comes into action as soon as the read address counter 3 displays the same contents as store 6: comparator 9 then causes loading of counter 3 to the value contained in store 5. It enables simultaneously AND gate 40 through gate 30. Counter 4 is then incremented by $N_0$ units by means of pulse generator 8.

It can be seen that the silent interval will have been reduced in the first instance, extended in the second. If the shift has a value such that the contents of counter 4 are still above the threshold, in absolute value, after this correction operation, the same procedure is re-initialized.

By way of simple example, it can be indicated that the device has been used in a receiver whose local clock had a relative stability of $10^{-5}$. The store had a capacity of 1k samples of 16 bits and could then be contained in a single package. The device only came into action for timing about every quarter of an hour with a silent interval duration of The order of 13 ms corresponding to $N_0 = 384$ samples.

The invention is not limited to the particular embodiments which have been shown and described by way of example.

I claim:
1. A process for synchronizing a digital signal comprising successive words representing quantized sound information samples and comprising silent periods, with a local reference clock during reconversion from said words to samples, comprising the steps of:
   writing the words in a local store in succession as they arrive;
   reading said words at the frequency of a local clock;
   continuously monitoring the degree of filling of the store;
   comparing said degree of filling with a range between predetermined maximum and minimum thresholds;
   detecting silent intervals as the presence of successive words having a level between a predetermined maximum value S1 and a predetermined minimum value S2 for a predetermined duration;
   and modifying the contents of the store on appearance of the first silent interval after said degree of filling has passed outside said range, by partially emptying the store of a given number of samples, if the degree of filling is higher than the maximum threshold, and by partially filling the store if the degree of filling is lower than said minimum threshold.

2. A process as claimed in claim 1, wherein the store is emptied or filled by a number of samples corresponding to a predetermined time duration.

3. A process as claimed in claim 2, wherein said duration and said predetermined maximum and minimum values are locally programmed at a station where said reconversion occurs.

4. A process as claimed in claim 2, wherein said duration and said predetermined maximum and minimum values are transmitted by a data channel parallel to a channel transferring the digital signal.

5. An apparatus for synchronizing a digital signal formed from successive words representing quantized samples of sound information and comprising silent periods, with a local clock asynchronous with the source of the signal and associated with a receiving device, comprising: a RAM store, means associated with the store for writing words in the store as they arrive; means for reading out the store at the frequency of the lock clock; means for providing predetermined minimum and maximum filling thresholds; means for detecting the degree of filling of the store; means for comparing said degree of filling with a range limited by said predetermined minimum and maximum filling thresholds; silent interval detector means; and means controlled by the comparison means for partially filling or emptying the store, as the case may be, during the first silent interval after the degree of filling has passed outside the said range.

6. An apparatus as claimed in claim 5, wherein the silent interval detector comprises means for detecting the presence in the store of a number N, at least equal to a predetermined number $N_0$, of successive words between predetermined maximum value S1 and minimum value S2.

7. A system for sound transmission, comprising an apparatus as claimed in claim 6, a device for elaborating said digital signal from said sound information, a transmission channel for communication of said digital signal from said device to said apparatus, and an additional channel in parallel relation with said transmission channel for transmission of said duration and said predetermined values from said device to said apparatus.

8. An apparatus as claimed in claim 5, wherein the means for detecting the degree of filling of the store comprise an up-down counter having an incrementation or up-counting input connected to a clock for writing in the RAM store and a decrementation or down-counting input connected to the local asynchronous reading clock and the means for comparison with a predetermined range comprise a comparator which receives output signals representative of the absolute value and of the sign of the contents of the up-down counter and supplies a signal for reduction or repetition of the silent interval when said absolute value exceeds a given threshold.

9. An apparatus as claimed in claim 8, wherein the means for partially filling or emptying the store comprise a generator adapted to deliver a predetermined number $N_0$ of output pulses upon receipt of a triggering pulse on an input thereof; a first auxiliary store for storing the address in the random access memory of the silent interval beginning, a second auxiliary store for storing the silent interval end address, $N_0$ words after the beginning, a first comparator causing the silent interval end address to be transferred into the random access memory reading address counter if there is coincidence between the real reading address and the auxiliary store address, in which case the store must be partially emptied, a second comparator for causing transfer from the silent interval beginning memory into the reading address counter of the random access memory when there is coincidence between the address in said counter and the stored address, in which case the store must be filled, means for applying a triggering pulse to said generator upon detection of said silent interval, and means for applying said output pulses from said generator to the upcounting input or downcounting input of said up-down counter depending upon whether the store must be partially emptied or filled.

* * * * *